(12) United States Patent
Fall et al.

(10) Patent No.: US 7,896,191 B1
(45) Date of Patent: Mar. 1, 2011

(54) REMOVABLE INSULATED HAND GRIP DEVICE FOR LID HANDLE

(75) Inventors: Thomas R. Fall, Tiburon, CA (US); Janet L. Fall, Tiburon, CA (US); Lisa M. Frolich, Larkspur, CA (US); Douglas M. Frolich, Larkspur, CA (US)

(73) Assignee: Chefs Originals LLC, Tiburon, CA (US)

( * ) Notice: Subject to any disclaimer, the term of this patent is extended or adjusted under 35 U.S.C. 154(b) by 517 days.

(21) Appl. No.: 11/961,303

(22) Filed: Dec. 20, 2007

Related U.S. Application Data

(60) Provisional application No. 60/876,534, filed on Dec. 22, 2006.

(51) Int. Cl.
  *B65D 25/10* (2006.01)
  *A47J 45/07* (2006.01)
  *B25G 1/10* (2006.01)

(52) U.S. Cl. ............... 220/753; 220/755; 220/757; 220/573.1; 16/425; 16/430

(58) Field of Classification Search ............ 16/406, 16/411, 425, 426, 430, 435; 220/753–757, 220/759, 760, 761, 768, 770, 775, 573.1, 220/912; D7/393, 395; D8/321, 322
See application file for complete search history.

(56) References Cited

U.S. PATENT DOCUMENTS

| | | | | |
|---|---|---|---|---|
| 1,023,175 A | * | 4/1912 | Sammis ................. | 16/411 |
| 1,719,461 A | * | 7/1929 | Bolton ................. | 220/753 |
| 1,793,575 A | * | 2/1931 | Williams ............... | 16/406 |
| 2,231,830 A | * | 2/1941 | Moore et al. ........... | 16/411 |
| 2,274,605 A | * | 2/1942 | Hoffmeister ............ | 16/411 |
| 2,287,329 A | * | 6/1942 | Santa Maria et al. ..... | 294/171 |
| 2,294,197 A | * | 8/1942 | Moore et al. ........... | 220/755 |
| 2,636,641 A | * | 4/1953 | Wiepert ................ | 220/762 |
| 3,035,733 A | * | 5/1962 | Knapp .................. | 220/215 |

(Continued)

OTHER PUBLICATIONS

"Cool Touch™ Lid Handle Covers & Lid Handle Covers II," web page downloaded from http:www.jazinnovations.com/Pages/LidHandleCovers.html, 1 page.

(Continued)

*Primary Examiner*—Anthony Stashick
*Assistant Examiner*—Brett Edwards
(74) *Attorney, Agent, or Firm*—Patent Law Group LLP; Carmen C. Cook

(57) ABSTRACT

A removable, insulated hand grip device for use with a closed loop lid handle includes a body formed of a flexible, compressible and low thermal conductivity material adapted to fill the first distance between the hand grip portion and the top surface of the lid, a lid handle engaging portion including a concave surface adapted to enclose at least partially the hand grip portion of the lid handle, a base portion including a surface adapted to engage the top surface of the lid under the hand grip portion, a finger grip portion including a concave surface formed on each longitudinal sides of the body adapted to receive the fingers of a user's hand. The body is removably attached to the lid handle and is secured between the bottom surface of the hand grip portion and the top surface of the lid by compression force.

9 Claims, 3 Drawing Sheets

U.S. PATENT DOCUMENTS

| | | | |
|---|---|---|---|
| 4,001,904 A * | 1/1977 | Gill | 7/151 |
| 4,197,611 A | 4/1980 | Bell et al. | |
| D266,896 S * | 11/1982 | Hellinger et al. | D7/393 |
| 4,364,150 A * | 12/1982 | Remington | 16/409 |
| 4,366,596 A | 1/1983 | Hellinger et al. | |
| 4,388,743 A * | 6/1983 | Hellinger et al. | 16/435 |
| D284,541 S * | 7/1986 | Bartasevich | D7/393 |
| 4,599,920 A * | 7/1986 | Schmid | 81/489 |
| 4,754,858 A * | 7/1988 | Robinson | 190/115 |
| 4,823,433 A * | 4/1989 | Curtis | 16/411 |
| 4,836,179 A * | 6/1989 | Schlosser et al. | 126/25 R |
| 5,297,766 A | 3/1994 | Hoffman | |
| D360,346 S * | 7/1995 | Huttner | D8/321 |
| 5,584,414 A * | 12/1996 | Neubeck | 220/753 |
| 5,613,274 A | 3/1997 | Gerdmann et al. | |
| 5,675,867 A * | 10/1997 | Howie, Jr. | 16/412 |
| 7,578,411 B1 * | 8/2009 | Zien et al. | 220/760 |
| 2003/0121921 A1 * | 7/2003 | Burton et al. | 220/366.1 |

OTHER PUBLICATIONS

Silicone Pot Holders, SeeFred.Com web page, 3 pages.
"Cool Touch Lid Handle Covers," firstSTREET web page, 2 pages.

* cited by examiner

REMOVABLE INSULATED HAND GRIP DEVICE FOR LID HANDLE

CROSS-REFERENCE TO RELATED APPLICATION

This application claims the benefit of U.S. Provisional Patent Application Ser. No. 60/876,534, filed on Dec. 22, 2006, having the same inventorship hereof, which application is incorporated herein by reference in its entirety.

FIELD OF THE INVENTION

The invention relates to insulating devices for enabling a hot object to be handled by human hands and, in particular, to a removable, insulated hand grip device for lids which is placed under the lid handle and secured between the lid handle and the top surface of the lid to allow ready and safe gripping of the lid.

DESCRIPTION OF THE RELATED ART

Many cooking utensils today include a lid with a metal lid handle formed in a closed loop on the top of the lid. The closed loop metal lid handle can get very hot when the cooking utensil is heated and becomes unsafe to be handled by the bare human hands. Many devices have been proposed to provide an insulated hand grips for the closed loop handles. For example, U.S. Pat. No. 4,388,743 describes a lid handle cover placed over the top of and covering the lid handle to provide a heat insulated gripping surface. In another example, the Cool Touch™ brand insulating lid handle cover slips onto the metal lid handles to provide a secure grip. With the increasingly popularity of all-metal cookware, effective heat insulated hand grips for lid handles continue to be in high demand.

SUMMARY OF THE INVENTION

According to one embodiment of the present invention, a removable, insulated hand grip device for a closed loop lid handle formed on a lid of a cookware where the closed loop lid handle has a hand grip portion being supported by two inwardly bent legs attached to the lid is described. The removable, insulated hand grip includes a body formed of a flexible, compressible and low thermal conductivity material where the body has a first height adapted to fill a space between a bottom surface of the hand grip portion of a lid handle and a top surface of the lid, a lid handle engaging portion formed on a top surface of the body and including a concave surface adapted to enclose at least partially the hand grip portion of the lid handle from below, a base portion formed on a bottom surface of the body and including a surface adapted to engage the top surface of the lid under the hand grip portion of the lid handle, a finger grip portion formed on both longitudinal sides of the body and extending from the lid handle engaging portion to the base portion where the finger grip portion includes a concave surface formed on each longitudinal sides of the body adapted to receive fingers of a user's hand. The body is removably located in the space between the bottom surface of the hand grip portion of the lid handle and the top surface of the lid and is secured by compression force provided by the bottom surface of the hand grip portion of the lid handle and the top surface of the lid.

The present invention is better understood upon consideration of the detailed description below and the accompanying drawings.

DETAILED DESCRIPTION OF THE PREFERRED EMBODIMENTS

In accordance with the principles of the present invention, a removable, insulated hand grip device for use with a closed loop handle is made of a flexible material with low thermal conductivity and is inserted underneath the closed loop lid handle and secured in place by compression force between the bottom of the lid handle and the top surface of the lid. The hand grip device of the present invention includes a lid handle engaging portion for attaching to the bottom side of the lid handle and a finger grip portion adapted to receive the fingers of a user's hand. In this manner, the hand grip device enable safe handling of cookware lids which may be heated to a high temperature during use.

In one embodiment, the hand grip device for lid handles is attached and removed from the lid handle by the assertion of lateral force to push the hand grip device out from under the lid handle. Moreover, in one embodiment, the hand grip device is made of a material which is dishwasher safe and oven safe up to approximately 500° C. Therefore, the hand grip device of the present invention can be fixed in place on the lid handle prior to heating of the lid so that the hand grip device is ready for use when the lid handle becomes hot. The hand grip device can remain attached to the lid handle when the lid is washed.

Figure 8:
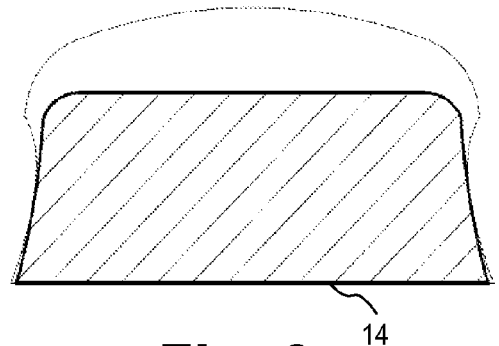
FIG. 8 is a cross-sectional view of the hand grip device of FIG. 7 along the line C-C'.
Figure 9:
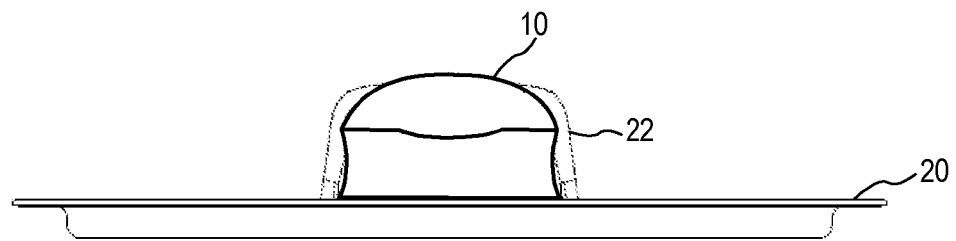
FIGS. 9-11 illustrate the hand grip device engaged with a closed loop lid handle of a lid for a cookware according to one embodiment of the present invention.
Figure 10:
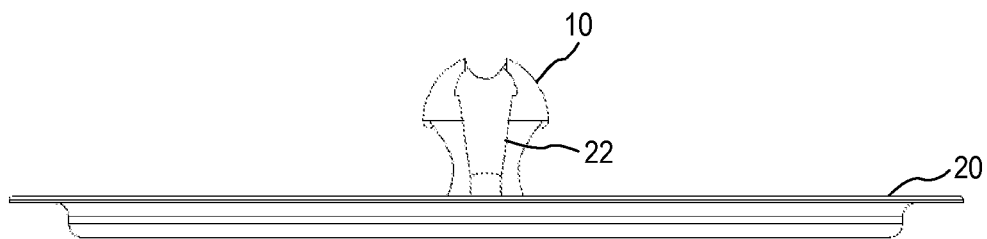
Figure 11:
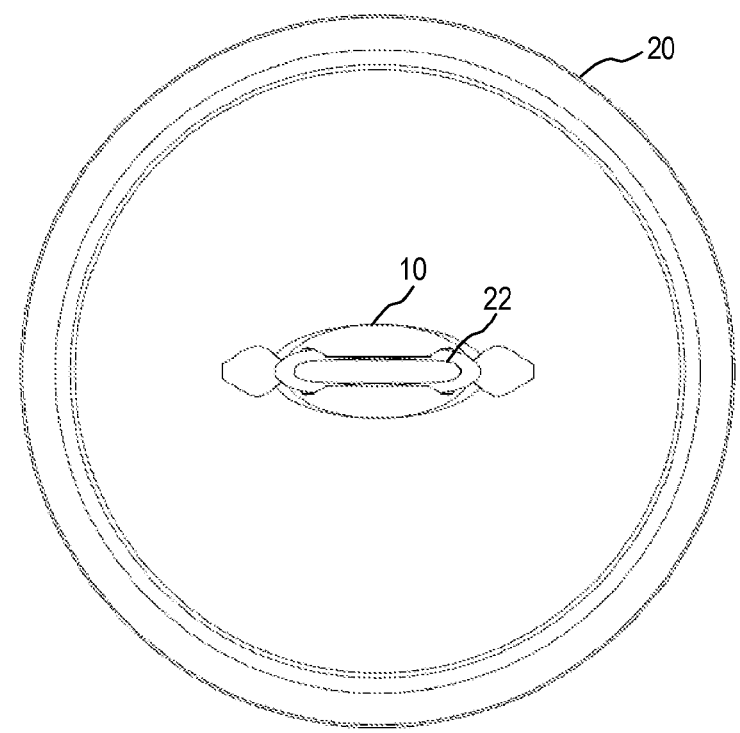

The removable, insulated hand grip device of the present invention will now be described with references to FIGS. 1-8. FIGS. 9-11 illustrate an application of the hand grip device of the present invention for use with a pot lid according to one embodiment of the present invention. The hand grip device of the present invention is adapted for use with a closed loop lid handle having a hand grip portion spaced apart from the top surface of the lid and being supported by two inwardly bent legs attached to the lid. The spacing between the top surface of the lid and the hand grip portion of the lid handle varies depending on the design of the lid handle.

Figure 1:
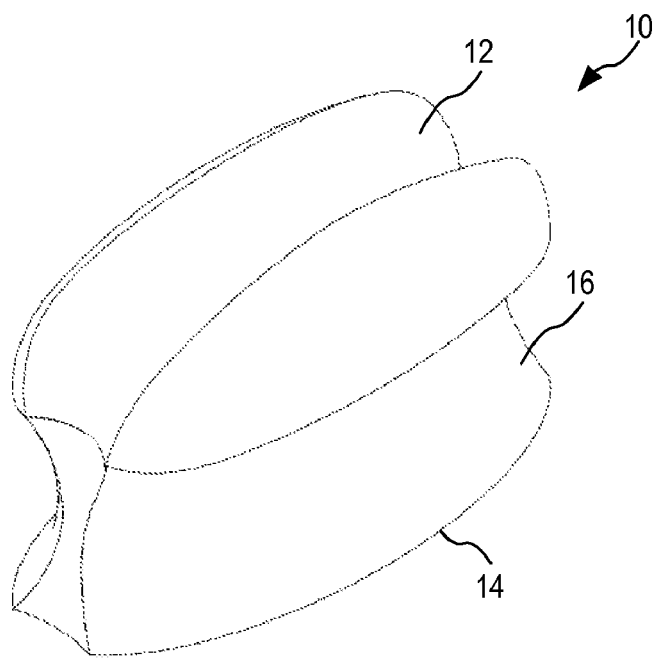
FIG. 1 is a perspective view of a removable, insulated hand grip device for use with a closed loop lid handle according to one embodiment of the present invention.
Figure 2:
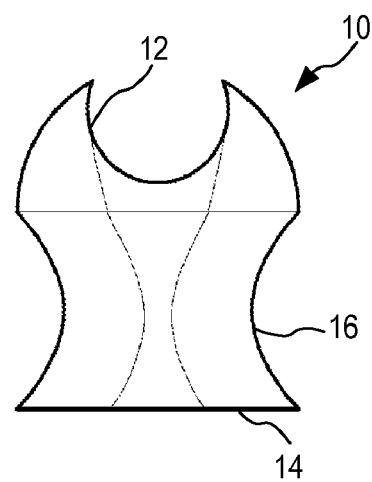
FIG. 2 is a front view of the hand grip device of FIG. 1.
Figure 3:
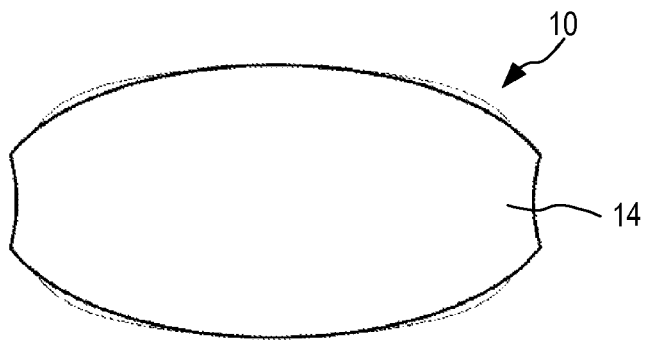
FIG. 3 is a bottom view of the hand grip device of FIG. 1.

Referring to FIGS. 1-3, a hand grip device 10 includes a body formed of a flexible, compressible and low thermal conductivity material. In one embodiment, the body is formed using a heat resistance and flexible rubber material, such as silicone rubber. Furthermore, in one embodiment, the body is formed using a silicone rubber sold under the trademark SILASTIC. Other suitable materials can be used to form the body of hand grip device 1 and the use of silicone rubber in the present embodiment is illustrative only. It is only important the body of hand grip device 10 is formed using a material that provides thermal insulation, flexibility and compressibility.

In the present embodiment, the hand grip device 10 has a one-piece construction. In other embodiments, hand grip device is constructed in two or more separate pieces connected together. The particular method of construction is not essential so long as hand grip device 10 has the properties and characteristics described herein. When hand grip device 10 is constructed from separate parts, it is understood that the parts can be connected together in manners known to those skilled in the art, including mechanical locking arrangement, use of glue, or other fastening materials. Hand grip device 10 can be manufactured using techniques known to those skilled in the art, including injection molding, thermoforming, and other methods of fabricating rubber compounds such as room temperature vulcanizing.

The body of hand grip device 10 has a height adapted to fill the space between the hand grip portion of the lid handle and the top surface of the lid. In particular, the body of hand grip device 10 includes a lid handle engaging portion 12 formed on a top surface of the body. The lid handle engaging portion 12 has a concave surface adapted to enclose at least partially the hand grip portion of the lid handle from below, as shown in FIGS. 1 and 2. When attached to the hand grip portion of the lid handle, the lid handle engaging portion cradles the bottom part of the hand grip portion of the lid handle to secure the hand grip device in place.

The body of hand grip device 10 also includes a base portion 14 formed on the bottom surface of the body. The base portion 14 includes a surface adapted to engage the top surface of the lid under the hand grip portion. In the present embodiment, the base portion 14 has a flat surface. In other embodiments, the base portion 14 has a shape adapted to fit the contour of the top surface of the lid. Furthermore, in a preferred embodiment, the base portion 14 has a wide base to secure hand grip device 10 to the lid and to prevent the hand grip device from being easily rolled out from under the lid handle.

The body of hand grip device 10 further includes a finger grip portion 16 formed on both longitudinal sides of the body. The finger grip portion extends from the lid handle engaging portion 12 to the base portion. The finger grip portion includes a concave surface formed on each longitudinal sides of the body adapted to receive the fingers of a user's hand. The concave surfaces of finger grip portion 16 serve as two tactile indices for providing two tactile reference points for properly positioning the fingers onto hand grip device 10. The tactile indices permits the user to properly position the user's hand on the hand grip device and avoiding contacts with the heated surface of the lid or lid handler.

Figure 4:
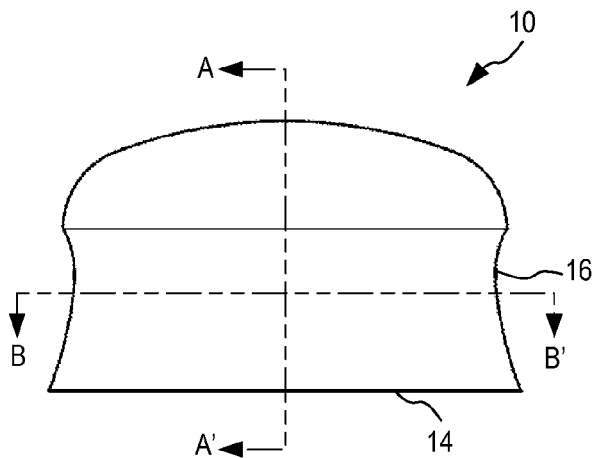
FIG. 4 is a side view of the hand grip device of FIG. 1.
Figure 5:
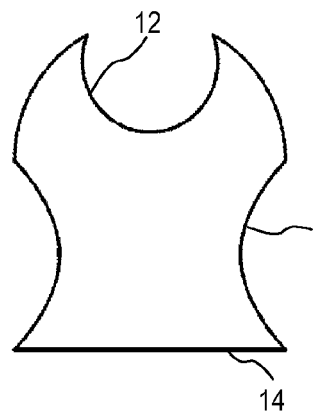
FIG. 5 is a cross-sectional view of the hand grip device of FIG. 4 along the line A-A'.
Figure 6:
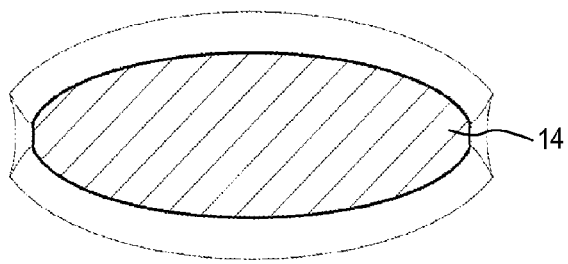
FIG. 6 is a cross-sectional view of the hand grip device of FIG. 4 along the line B-B'.

FIG. 4 illustrates a side view of hand grip device 10. FIG. 5 is a cross-sectional view of the hand grip device along a line A-A'. As shown in FIG. 5, the lid handle engaging portion 12 has a concave shape adapted to fit around and cradle the bottom part of the lid handle. The finger grip portion 16 is formed on both sides of the body of the hand grip device 10 to provide a safe and secure gripping surface. The base portion 14 is a flat surface in the present embodiment. FIG. 6 is a cross-sectional view of the hand grip device along a line B-B'. In the present embodiment, the body of the hand grip device 10 has a solid construction, without any holes or voids. Furthermore, in the present embodiment, the body of hand grip device 10 has an elliptical shape in the lateral direction, as shown in FIG. 3. Moreover, the body is narrower at the bottom than the top to make it moderately flexible to aid when inserting the hand grip device underneath the lid handle.

Figure 7:
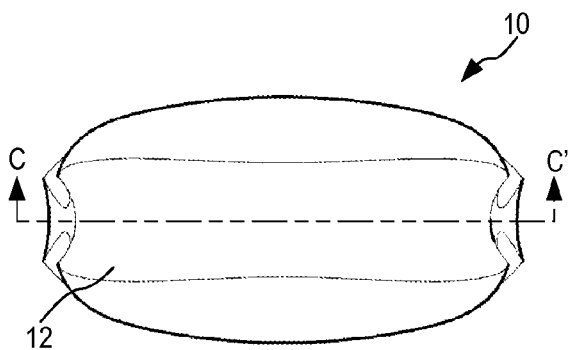
FIG. 7 is a top view of the hand grip device of FIG. 1.

FIG. 7 illustrates a top view of hand grip device 10. FIG. 8 is a cross-sectional view of the hand grip device along a line C-C'. As shown in FIGS. 7-8, the lid handle engaging portion 12 extends substantially to the ends of the body of hand grip device 10. Furthermore, the profile of the lid handle engaging portion 12 is selected to match the profile of the lid handle to which the hand grip device is to be applied.

A salient feature of the hand grip device of the present invention is the hour glass shape of the body, as shown in FIGS. 2 and 5. More particularly, the finger grip portion 16 formed on the longitudinal sides of the body includes a convex portion extending from the lid handle engaging portion. The convex surface transitions into the concave surface adapted to receive the user's fingers. As thus formed, the hand grip device has an overall hour glass shape which allows the body to compress securely into position with moderate flexibility underneath the lid handle.

When in use, hand grip device 10 is removably attached to the lid handle and is secured between the bottom surface of the hand grip portion and the top surface of the lid by compression force. Referring to FIGS. 9-11, hand grip device 10 is inserted underneath a pot lid handle 22 of a lid 20. The hour glass shape of hand grip device 10 allows the body to compress securely into position with moderate flexibility underneath the lid handle 22. The concave shape of the lid handle engaging portion ensures that hand grip device 10 fits securely in position underneath the hand grip port of the lid handle 22. The lid handle engaging portion also keeps the user from coming into contact with the heated surface of the pot lid handle.

The exact dimensions (length, height and width) of the hand grip device 10 will vary depending on the design of the lid handle to which it is adapted for use. For example, the hand grip device of the present invention can be adapted for use with cookware manufactured by Calphalon, All-Clad, Cuisinart, Wolfgang Puck, and Viking.

In the present embodiment, the length of the hand grip device of the present invention extends to the full length of the lid handle, as shown in FIG. 9. In other embodiments, the length of the hand grip device can be shortened and does not necessarily have to extend to the full length of the lid handle.

The above detailed descriptions are provided to illustrate specific embodiments of the present invention and are not intended to be limiting. Numerous modifications and variations within the scope of the present invention are possible. The present invention is defined by the appended claims.

We claim:

1. A removable, insulated hand grip device for a closed loop lid handle formed on a lid of a cookware, the closed loop lid handle having a hand grip portion being supported by two inwardly bent legs attached to the lid, the hand grip device comprising:

a body formed of a flexible, compressible and low thermal conductivity material, the body having a first height adapted to fill a space between an inside surface of the hand grip portion of a lid handle and a top surface of the lid;

a lid handle engaging portion formed on a top surface of the body and comprising a concave surface adapted to enclose at least partially the hand grip portion of the lid handle from below;

a base portion formed on a bottom surface of the body and comprising a surface adapted to engage the top surface of the lid under the hand grip portion of the lid handle;

a finger grip portion formed on both longitudinal sides of the body and extending from the lid handle engaging portion to the base portion, the finger grip portion comprising a concave surface formed on each longitudinal sides of the body adapted to receive fingers of a user's hand, wherein the body is removably located in the space between the inside surface of the hand grip portion of the lid handle and the top surface of the lid and is secured by the resiliency of the body compressed against the inside surface of the hand grip portion of the lid and the top surface of the lid.

2. The removable, insulated hand grip device of claim 1, wherein the body is formed using a heat resistance and flexible rubber material.

3. The removable, insulated hand grip device of claim 1, wherein the body is formed using silicone rubber.

4. The removable, insulated hand grip device of claim 1, wherein the body has a one piece construction.

5. The removable, insulated hand grip device of claim 1, wherein the base portion comprises a flat surface.

6. The removable, insulated hand grip device of claim 1, wherein the base portion has a first width sufficient to secure the hand grip device to the lid handle and prevent the hand grip device from being rolled out.

7. The removable, insulated hand grip device of claim 1, wherein the finger grip portion formed on both longitudinal sides of the body comprises a convex portion extending from the lid handle engaging portion, the convex surface transitioning into the concave surface adapted to receive the fingers of the user's hand, resulting in an hour glass shape for the body.

8. The removable, insulated hand grip device of claim 1, wherein the body extends substantially to the two legs of the lid handle under the hand grip portion.

9. The removable, insulated hand grip device of claim 1, wherein the base portion has a shape adapted to fit the contour of the top surface of the lid.

* * * * *